United States Patent [19]

Baitz et al.

[11] Patent Number: 5,380,990
[45] Date of Patent: Jan. 10, 1995

[54] TILL DRAWER FOR A CASH REGISTER

[75] Inventors: Günter Baitz, Klantorweg; Joachim Burchart, Schlangen; Hartmut Kamin, Berlin, all of Germany

[73] Assignee: Siemens Nixdorf Informationssysteme Aktiengesellschaft, Paderborn, Germany

[21] Appl. No.: 30,432

[22] PCT Filed: Sep. 25, 1991

[86] PCT No.: PCT/EP91/01821

§ 371 Date: Mar. 24, 1993

§ 102(e) Date: Mar. 24, 1993

[87] PCT Pub. No.: WO92/05525

PCT Pub. Date: Apr. 2, 1992

[30] Foreign Application Priority Data

Sep. 26, 1990 [DE] Germany ............... 4030456

[51] Int. Cl.6 ........................... G07G 1/00
[52] U.S. Cl. ............................. 235/7 R; 235/22; 235/375; 312/333
[58] Field of Search .............. 235/1 E, 2, 7 R, 10, 235/22, 28, 375; 364/404, 405; 70/85-88; 109/19, 45; 312/333, 293.3

[56] References Cited

U.S. PATENT DOCUMENTS

| 4,245,331 | 1/1981 | Hamano et al. | 235/7 R |
|---|---|---|---|
| 4,436,989 | 3/1984 | Schuldt | 235/22 |
| 4,637,326 | 1/1987 | Baitz et al. | 235/22 |
| 4,642,449 | 2/1987 | Baitz et al. | 235/22 |
| 4,775,075 | 10/1988 | Kamin et al. | 220/331 |
| 4,786,785 | 11/1988 | Felt | 235/7 R |
| 4,920,256 | 4/1990 | Marty et al. | 235/441 |
| 5,113,183 | 5/1992 | Mizuno | 364/404 |

FOREIGN PATENT DOCUMENTS

| 0059352 | 9/1982 | European Pat. Off. |
|---|---|---|
| 0072370 | 2/1983 | European Pat. Off. |
| 0156379 | 3/1984 | European Pat. Off. |
| 0234596 | 9/1987 | European Pat. Off. |
| 0255598 | 2/1988 | European Pat. Off. |
| 8409724 | 6/1984 | Germany |
| 3411686 | 12/1984 | Germany |
| 3806771 | 3/1987 | Germany |
| 54-143294 | 10/1979 | Japan |

*Primary Examiner*—Michael L. Gellner
*Assistant Examiner*—Eddie C. Lee
*Attorney, Agent, or Firm*—Hill, Steadman & Simpson

[57] ABSTRACT

The money drawer (3) has a lid (14), which is connected to the drawer housing (2) by the money drawer (3) being slid into the drawer housing and is detachable from the drawer housing (2) through the creation of the locking attachment between the lid and the money drawer. In a preferred refinement, the lid (14) contains a receiving tray (50) for an integrated circuit card, preferably for one conforming to ISO Standard 7816.2.3. A till drawer of this kind is suitable for all cash registers and, due to the possible allocation of a money drawer to a specific member of the till staff, can preferably be used in respect of cash registers where there is a frequent changeover of staff. The cards can be used as a company identity card enabling a cashier to clock on at the cash register.

8 Claims, 2 Drawing Sheets

TILL DRAWER FOR A CASH REGISTER

FIELD OF THE INVENTION

The invention relates to a till drawer for a cash register having a money drawer which is displaceably guided in the push-in and draw-out direction, and having a lid which is detachably locked to the money drawer in its closing position by means of a locking device.

DESCRIPTION OF THE RELATED ART

A till drawer of this kind is known from German Utility Model 84 09 724. This till drawer has a money drawer and a lid drive-connected therewith, which opens when the money drawer is drawn out and closes when the money drawer is pushed in. In the drawer housing of the known till drawer, at least one toothed segment is provided, which engages in each case with a toothed rack fitted to the money drawer, the lid being fixed to the toothed segment. Since the lid automatically lifts up when the money drawer is drawn out, there is generally in this position, but also in the case of a money drawer which has been removed from the drawer housing or of a money tray which has been removed from the money drawer, no protection against the money present in the money drawer being stolen, so that final totaling up can be wrong if money has been stolen from the money drawer. Where a money drawer has been left unattended, totaling-up problems can therefore arise at the end of a work unit.

German Application 34 11 686 C1 discloses a till drawer having a money drawer, which is displaceably guided in the push-in and draw-out direction, and having a lid. The lid is configured as an independent part, which can optionally be mounted onto a transport strongbox for transporting a money tray for the drawer or onto the money tray itself and can be locked to this.

European Application 0 059 352 discloses a till drawer having a money drawer which can be drawn out and pushed in and supports a sliding lid, which, in counter-running direction to the movement of the drawer, is adjustably coupled to the drawer, so that when the drawer is opened forwards the lid is displaced backwards. This lid is not capable of securing the cash contents.

SUMMARY OF THE INVENTION

The object of the invention is to provide a till drawer in which totaling-up discrepancies can less easily arise.

This object is achieved according to the invention by a till drawer having the lid connected to the drawer housing by the money drawer being slid in and is detachable from the drawer housing by a locking attachment to the money drawer.

It is favorable in this case that the lid is connected to the drawer housing by the money drawer being slid in and is detachable from the drawer housing by a locking attachment to the money drawer. In the following description and in the patent claims, the term money drawer is understood to include a money tray which can be inserted into a till drawer of a cash register, so that the lid, by the locking attachment also between the lid and the money tray, is detachable from the drawer housing and the money tray is removable from the till drawer. Consequently, when the cash register is used, the lid is able to remain in the drawer housing and is unable to impair the operation of the register and the reckoning-up or ringing up of the goods to be registered. It is additionally ensured that the connection between the lid and the drawer housing can only be released once the lid is located in its closed position, i.e. the money drawer is in its position in which it is slid into the drawer housing, and the lid and the money drawer are locked to one another. Accordingly, the money drawer can only be removed from the drawer housing if the lid is locked onto it. In order to connect the lid and the drawer housing, the money drawer must be slid at least partially into the drawer housing. In a preferred embodiment, the lid connected to the drawer housing is located fully within the drawer housing. The money drawer according to the invention is therefore normally closed outside the drawer housing, so that amounts of money cannot directly be removed from the money drawer, even it is left unattended. The locking device can have two functions—to lock the lid to the money drawer and to release the connection of the lid to the drawer housing.

Preferably, the lid is displaceably guided on the money drawer and can be latch-locked to the drawer housing by means of a latch device which can be actuated by the sliding-in of the money drawer. A slide runner is easy to make and simple to use. While the cash register is being operated, the lid can on the one hand be advantageously connected to the drawer housing by means of the latch device, thereby making the money drawer easier to use. On the other hand, a removal or withdrawal of the money drawer from the drawer housing is effectively prevented. The actuation of the latch device can be effected and triggered directly by the lid located on the money drawer or indirectly by the money drawer mechanically, electrically, hydraulically, pneumatically or by other means.

Preferably, the latch device is a latch lever, extending parallel to the direction of motion of the lid and pivotable in the plane of the lid about a swivel axle mounted on the lid, which latch lever is pre-tensioned by a spring into its latch-locking position. The front end of the latch lever, in the slide-in direction of the lid, can have a latch boss, which, in the position of the lid slid at least partially into the drawer housing, back-grips a pin secured on the drawer housing. The rear end of the latch lever, in the slide-in direction, ideally extends nearly up to the lid rear edge. A latch device of this construction is especially easy to use, since the lid slid with the money drawer into the drawer housing automatically, in a certain position, latch-locks to the drawer housing, so that the lid has little or no adverse effect upon the operation of the money drawer, especially when the lid is fully located in the drawer housing. Since the rear end of the latch lever can be located close to the lid rear edge, the possibility also exists of releasing the latch lever from its position back-gripping the pin by manually pivoting, for example, the rear end of the latch lever through the open side of the money drawer.

Advantageously, the locking device is disposed and configured so as to act upon the rear end of the latch lever, so that the locking device, in addition to its function of connecting the lid to the money drawer, can also serve to adjust the latch lever of the latch device and to release the connection between the lid and the drawer housing. In this embodiment, the rear end of the latch lever is disposed in the area of the slide-in opening of the drawer housing for the money drawer and is therefore especially easily accessible to any actuation.

In a refinement of the till drawer, the locking device is a lock bolt provided with a lock, which lock bolt is movable between a locking position blocking any movement of the lid and an unlocking position freeing such a movement. In this embodiment, the money drawer can only be removed from the drawer housing by means of a key fitting the lock of the lock bolt, so that unauthorized persons are unable to release the connection between the lid and the drawer housing.

Preferably, the lid has a stop which prevents the money drawer from being pulled fully out whenever the lid is connected to the drawer housing. A removal or withdrawal of the money drawer from the drawer housing is thereby effectively prevented. Only when the stop is released by a person authorized to do so can the money drawer be pulled fully out of the drawer housing. The stop is thus an additional protection to ensure that the lid is connected in all operating positions to the money drawer and is not forgotten in the drawer housing after the end of a work unit, for example. It is additionally ensured that the money drawer located outside the drawer housing can in all cases be closed by the lid.

It is additionally favorable for the lid rear edge to be configured at least partially as a stop which is bent over in the direction of the money drawer, the width of the said stop being greater than the distance between the lid and the top edge of the money drawer. A stop of this kind is easy to construct and can be provided on the lid at low cost. If the money drawer is pulled out of the drawer housing when the lid is latch-locked to the drawer housing, the stop provided on the lid rear edge acts as a stop which grips against the front wall of the money drawer, so that the money drawer cannot be pulled fully out of the drawer housing. The theft of the money drawer, without the latch device of the lid being actuated, can thus be largely ruled out.

Advantageously, the money drawer, in its position slid into the drawer housing, can be locked to the drawer housing, this locking attachment being able to be released by means of the locking device. It is thus possible to close the money drawer located in the cash register and to secure it against unauthorized access. Following completion of the work unit, the till staff therefore have the choice of either locking the money drawer in the cash register or of removing the money drawer from the drawer housing and storing it safely elsewhere. The locking device can therefore, as an additional function, not only serve to lock the lid to the money drawer or release the connection between the lid and the drawer housing, but can also serve, in addition to the electromechanical unlocking (known per se), to unlock the money drawer from its position slid into the drawer housing. As a result of the threefold action of the locking device, the construction of the till drawer is further simplified.

In a further refinement of the till drawer, the lid, close to its front end in the slide-in direction, has a receiving tray for at least one integrated circuit card, preferably one conforming to ISO Standard 7816, the receiving tray preferably having a cover which is pivotably mounted on the top side of the lid and can be closed by the lid. This embodiment has the advantage that data, for example about the particular till staff, or the day's takings, can be stored on the card. In addition, the card can contain the amount of money of the particular money drawer. This yields considerable time savings, for example in totalling up the daily takings of the whole of the till staff. A closable receiving tray of this kind further enables the card to be used as a company identity card, by which the till staff can automatically clock on or off with the cash register computer or with a higher-level data-processing system. Complicated inputting procedures when cashiers are changed over can thereby be eliminated. The card can also be used as a company identity card for switching on the operating functions of the cash register.

BRIEF DESCRIPTION OF THE DRAWINGS

Illustrative embodiments of the subject of the invention are explained in greater detail below with reference to the drawing, in which.

DETAILED DESCRIPTION OF THE PREFERRED EMBODIMENTS

Figure 1:
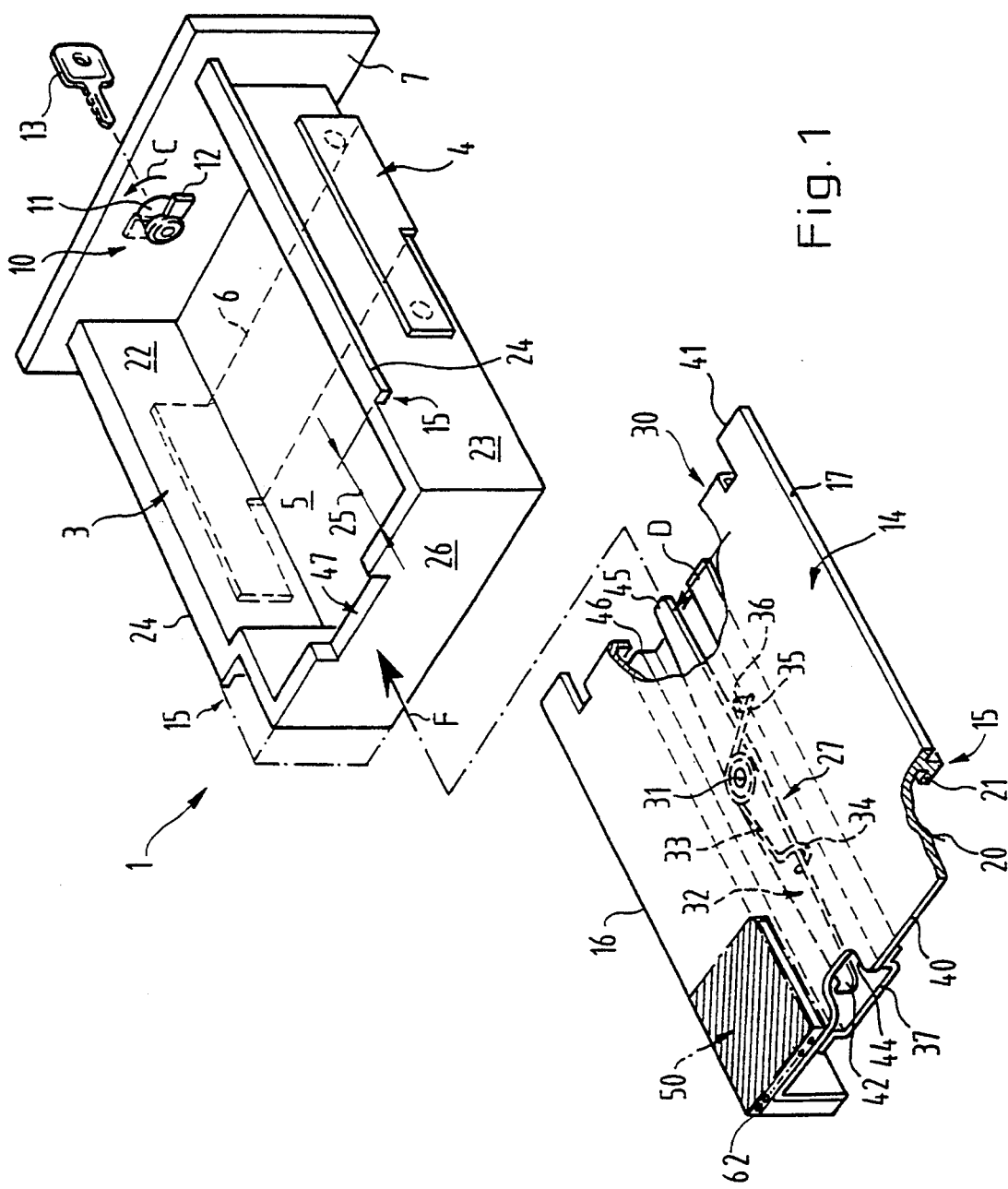
FIG. 1 shows a diagrammatic, exploded, perspective view of a till drawer for a cash register.

In FIG. 1, a till drawer 1 for a cash register (not shown in greater detail) is shown diagrammatically in exploded representation. The till drawer 1 essentially comprises a money drawer 3, which is displaceably guided in the draw-out and push-in direction (see arrows A, B in FIG. 2) in a drawer housing 2 and is disposed and configured such that, prior to usage of the cash register, i.e. prior to each work unit, it can be slid into the drawer housing 2 and, after use of the cash register is completed, i.e. after each work unit, can be removed from the drawer housing 2.

As indicated in FIG. 1, the money drawer 3 is supported on a mounting 4, which partially embraces the money drawer. According to FIG. 1, the mounting is a U-shaped profile, into which the money drawer 3 is inserted or slid. The mounting 4 is connected to guide rails (in a manner not shown in greater detail), which are fastened in the drawer housing 2 and enable a displacement movement of the mounting and of the money drawer connected thereto in the draw-out and push-in direction (see arrows A and B in FIG. 2). In order, while the cash register is in use, to prevent a relative movement between the money drawer 3 and the mounting 4, the base wall 5, in its (in FIG. 1) downwardly pointing outer side, has a recess 6, the width of which slightly exceeds the width of the mounting 4 in this area. This ensures that the money drawer 3, in its position supported on the mounting 4, cannot be displaced relative to the mounting 4. The insertion of the money drawer 3 into the mounting 4 is especially easy from above in FIG. 1. The money drawer 3 and the mounting 4 can also however be otherwise detachably interconnected, for example by latch means.

It is also conceivable for the money drawer 3 to be fixed to the mounting 4 and for the actual container for the reception of money to be inserted loosely into the money drawer. A container of this kind is generally known in the form of a money tray and is not therefore represented.

Figure 2:
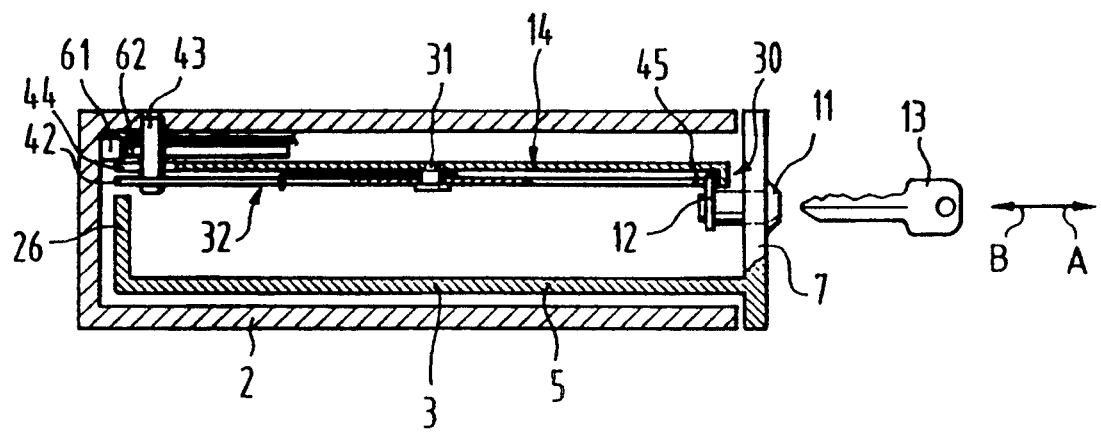
FIG. 2 shows a partially cut side view of the till drawer according to FIG. 1, in its position slid into a drawer housing.

According to FIGS. 1 and 2, the money drawer 3 has a lid 14, which is movable between a closing position closing the money drawer 3 (see FIG. 2) and a release position freeing the money drawer (cf. also FIG. 1) and is detachably locked, in its closing position, to the money drawer 3. For this purpose, the lid 14 is displaceably guided on the money drawer 3 by means of a slide runner 15 and can be locked to the money drawer 3 by means of a locking device 10 (cf. FIG. 2). The slide runner 15 comprises an L-shaped profile 21, fitted close to each side edge 16, 17 of the lid 14 on its underside 20, which profile embraces a bar 24 configured at the upper end of each side wall 22, 23 of the money drawer 3. The bars 24 start close to the rear wall 7 and end a measure 25 in front of the front wall 26 of the money drawer 3 in the push-in direction B. Where a money tray is used, the bars 24 and the elements 10, 11, 12 described further below are not fitted to the money drawer 3 but to the money tray. The illustrative embodiment having a money tray is not further discussed below. The lid 14 is connected to the drawer housing 2 through the money drawer 3 being slid into the drawer housing 2 and is detachable from the drawer housing through the creation of the locking attachment, as is described in greater detail below.

When the money drawer 3 is slid fully into the drawer housing 2 (cf. FIG. 2), the lid 14 can be latch-locked to the drawer housing 2 by means of a latch device 27 and has a stop 30, which prevents the money drawer 3 from being pulled fully out when the lid 14 is connected to the drawer housing 2. According to FIGS. 1 and 2, the latch device 27 is a latch lever 32 extending parallel to the direction of motion (see arrows A and B in FIG. 2) of the lid 14 and pivotable in the plane of the lid about a swivel axle 31 mounted on the lid, which latch lever is pre-tensioned by a spring 33 into its latch-locking position shown in FIG. 1, i.e. in the clockwise direction. The latch lever 32 is connected, approximately at its longitudinal midpoint, by the swivel axle 31 to the lid 14. According to FIG. 1, the spring 33 is a torsion spring, which is disposed in the area of the swivel axle 31 and the one end 34 of which acts upon the latch lever 32 and the other end 35 of which is supported against the lid 14 by means of a peg 36. The spring can also however be a tension or a pressure spring supported against one end of the latch lever 32.

The latch lever 32 is of elongated configuration and extends on the underside 20 of the lid 14 over virtually its entire length. The latch lever is surrounded by a channel-shaped cover 37, which is fastened to the underside 20 of the lid 14 and extends from the front end 40 of the lid nearly up to the lid rear edge 41. The front end 40 of the latch lever 32, in the slide-in direction of the lid 14, has a latch boss 42, which, in the position of the lid 14 slid into the drawer housing 2 (cf. FIG. 2), back-grips a pin 43 secured on the drawer housing 2. In the area of the latch boss 42 of the latch lever 32, the lid 14 has a recess 44, in which the pin 43 is located when the lid is slid fully into the drawer housing 2.

The locking device 10 is fitted to the rear wall 7 of the money drawer 3, in the push-in direction (see arrow B in FIG. 2). According to FIGS. 1 and 2, the locking device 10 is a lock bolt 12 provided with a lock 11, which lock bolt can be moved between a locking position blocking a movement of the lid 14 and an unlocking position freeing such a movement. In the previously described embodiment, the lock bolt 12 of the locking device 10, upon an approximately 90° rotation of the lock 11 by means of a key 13 (see arrow C in FIG. 1), is able to engage into a recess (not shown in greater detail) in the rear area of the lid 14 (dashed representation of the, in FIG. 1, upwardly pivoted lock bolt 12) or is able to back-grip the stop 30.

The rear end 45, in the push-in direction, of the latch lever 32 extends nearly up to the lid rear edge 41. The locking device 10 is disposed and configured so as to act upon the rear end 45 of the latch lever 32, so that the lock bolt 12, in its (according to arrow C) upwardly pivoted locking position (represented as a dashed line in FIG. 1), is able to act upon the rear end 45 of the latch lever 32 (see arrow D in FIG. 1). For this purpose, the rear end 45 of the latch lever 32 projects by a small measure over the rear end 46 of the channel-shaped cover 37. This measure is at least equivalent to the thickness of the lock bolt 12.

Figure 3:
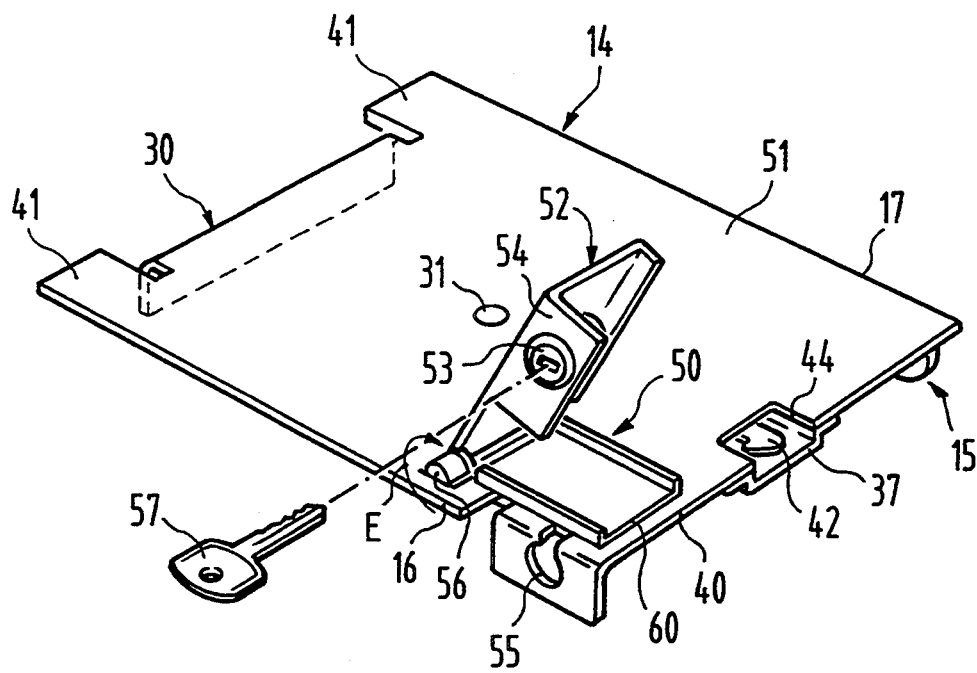
FIG. 3 shows a diagrammatic, perspective view of a lid for the till drawer exhibiting a receiving tray for a card-shaped circuit carrier, preferably a storage card.

According to FIGS. 1 through 3, the lid rear edge 41 is partially configured as a stop 30 which is bent over in the direction of the money drawer 3, the width of the stop being greater than the distance between the lid 14 and the top edge of the money drawer 3. According to FIGS. 1 and 3, the lid rear edge 41 in the area of the slide runner 15 is not bent over in the direction of the money drawer, but instead, when the lid 14 is guided on the money drawer 3, acts as a stop against the rear wall 7 of the money drawer 3. At its (in FIG. 1) upper end, the front wall 26 of the money drawer 3 has a setoff 47, the length and depth of which are at least equivalent to the corresponding sizes of the channel-shaped cover 37.

In another illustrative embodiment (not represented in greater detail), the money drawer 3, in its position slid into the drawer housing 2, can be locked to the drawer housing 2 by means of the locking device 10. The lock bolt 12 of the locking device 10 can engage, for example, into a recess (not shown) in the underside of the upper wall of the drawer housing 2.

According to FIGS. 1 and 3, the lid 14 has close to its front end 40 a receiving tray 50 for card-shaped circuit carriers, preferably cards (not shown in greater detail) having integrated switching circuits, preferably according to ISO Standard 7816, the receiving tray 50 having a cover 52, which is pivotably mounted on the top side 51 of the lid 14 and can be closed by the lid 14 by means of a lock 53 (see FIG. 3). The cover 52 is of L-shaped configuration, a leg 54 of this L-profile extending in the vertical direction and receiving the lock 53. In the area of the front end 40 of the lid 14, the side edge 16 is angled, is bent in the downward direction in FIG. 3 and has an opening 55 for the lock bolt (not shown in greater detail) of the lock 53. The cover 52 can be pivoted about its swivel axle 56 in the direction of the arrow E in order to hold a card (not shown) in the receiving tray 50 and, when the cover 52 is disposed parallel to the top side 51, can be barred by means of a key 57 and the lock 53.

When the cover 52 is closed, the receiving tray 50 has, at its end 60 close to the front end 40 of the lid 14, a slot (not represented in greater detail), the width of which is less than the thickness of the card disposed in the receiving tray, but is large enough to allow contact elements 61 or signal transmitting elements of a pin bar (not shown in greater detail) disposed in the drawer housing 2 to engage through the slot of the receiving tray 50 into a contact fixture 62 of the card configured at the front end of the card. When the lid 14, guided on the money drawer 3, is slid into the drawer housing 2, the contact elements 61 automatically contact the respective contact fixture 62 of the card. The cards can be configured as memory cards, as they are known, and can contain, for example, data about the till staff and the day's takings obtained at the particular cash register. In addition, the amount of change in the money drawer 3 and the working hours of the till staff can also be stored on the card. The card can also however be a simple storage card for the storage of information. Preferably, however, the card is a chip card (integrated circuit, card), the circuits interacting with the control system of the cash register and switching on, for example, the operating functions of the till, etc.

The operation of the till drawer for a cash register is described in greater detail below.

A card-shaped circuit carrier (not shown in greater detail), e.g. an integrated circuit card, is placed into the receiving tray 50 located on the top side 51 of the lid 14, such that the contact fixture 61 of the card points to the end 60 of the receiving tray. The cover 52 of the receiving tray 50 is pivoted in the direction of the arrow E (see FIG. 3), until the lock bolt (not shown) of the lock 53 engages into the opening 55 and can be twisted by means of the key 57 such that the receiving tray is barred and the card located therein is secured against removal.

The lid 14 is now placed onto the money drawer 3 in such a way that the lid rear edge 41 is found approximately in the area of the measure 25, i.e. between the front end of the slide runner 15 and the front wall 26 of the money drawer 3. In this position, the L-shaped profile 21 does not yet embrace the bars 24 of the slide runner 15. However, the rear end 46 of the channel-shaped cover 37 is already located approximately in the area of the setoff 47 configured in the front wall 26 of the money drawer 3. In this position of the lid 14, the change can also be put into the money drawer. The lid is then displaced in the direction of the arrow F (see FIG. 1) until the non-bent lid rear edge 41 butts against the rear wall 7 of the money drawer.

If so desired, the lock bolt 12 can be pivoted by means of the key 13 out of its position shown in FIG. 1 in the direction of the arrow C, until the free end of the lock bolt 12 back-grips the lid rear edge, configured as a stop 30. The lock 11 can be configured such that the key 13, even in this position which is preferably not acting upon the latch lever 32, can be pulled off from the money drawer 3. In this position, the lid is located in its barring position and is locked to the money drawer 3.

A till drawer of this type can be handed over to a member of the till staff, who preferably places it from above onto the mounting 4 of a cash register (not shown) in such a way that the mounting comes to be situated in the recess 6 provided in the base wall 5. The money drawer 3 is now slid with its lid 14, including the mounting 4, into the drawer housing 2 (cf. the push-in direction according to arrow B in FIG. 2), until the latch lever 32 executes a swivel movement, initially in the counter-clockwise direction, subsequently in the clockwise direction, about its swivel axle 31 and back-grips the pin 43 held in the drawer housing 2. According to FIG. 2, the money drawer is slid, in this position, fully into the drawer housing 2. It is however also possible for the money drawer, when the lid 14 is latch-locked to the drawer housing 2, to be only partially slid into latter. It is further conceivable for the money tray to be latch-locked, instead of to the drawer housing, to the money drawer firmly attached to the cash register.

By rotating the key 13 counter to the arrow C (see FIG. 1), the lock bolt 12 is transferred into its position shown in FIG. 1 by drawn-out lines and the money drawer 3 is freed for a displacement movement in the draw-out and push-in direction (see arrows A, B in FIG. 2). Upon the lid being latch-locked to the drawer housing, the contact elements of a pin bar (not shown) also engage into one or more contact fixtures, corresponding to the contact elements, of the particular card, so that the cash register is operative for the particular staff member. The cash register is then used in the traditional manner. However, the lid rear edge 41, which is configured as a stop 30 and is bent over in the direction of the money drawer 30, prevents the money drawer from being pulled fully out of the drawer housing without out the lid 14.

Following the completion of use of the cash register for the particular staff member, i.e. including a change-over of till staff, the staff member slides the money drawer fully into the drawer housing and pivots the lock bolt 12, by means of the key 13, in the direction of the arrow C until it reaches its position shown by the dashed line in FIG. 1, in which position the lock bolt acts in the direction of the arrow D, counter to the force of the spring 33, upon the rear end 45 of the latch lever 32, so that the latch lever 32 moves in the counter-clockwise direction about the swivel axle 31 and the latch boss 42 frees the pin 43. The money drawer 3, together with its lid 14 and the mounting 4, can now be pulled out of the drawer housing 2 of the cash register. Preferably, the key 13 is previously pulled out from the rear wall 7 of the money drawer, there being a possibility of the lock bolt, due to the force of the spring 33, pivoting by a small measure counter to the direction of the arrow C and the key only being able to be pulled out once the lock bolt 12 is in this position. It is however also possible for the key 13 to be able to be pulled out in the position of the lock bolt 12 shown by a dashed line; in this case, the latch lever 32 can be pre-tensioned against the lock bolt.

When the mounting 4 is withdrawn fully from the drawer housing 2, the money drawer, with its lid located in the barring position, is lifted out of the mounting 4 and stored in a safe place. At the same time as the money drawer with its associated lid is pulled out, the contact elements 61 also disengage from the card contacts 61, so that the particular cashier automatically clocks off from the cash register. A till drawer of such configuration is simply constructed and helps to prevent cashing-up discrepancies.

The previously described till drawer can be especially advantageously used if it is allocated to a specific member of the till staff. Every member of the till staff is then allocated his/her own money drawer, which is used exclusively by this person. When there is a change of till staff, the one person removes his/her money drawer from the drawer housing, whilst the other person inserts his/her own money drawer into the drawer housing. Errors which are noticed in individual money drawers during cashing-up can thus be attributed without difficulty to the person concerned, so that cashing-up discrepancies of the staff can less easily arise, especially when a plurality of persons have used the cash register during a work unit. Where there is a frequent changeover of till staff, "switching" as it is known, any cashing-up errors which arise, e.g. in the issuing of change from the money drawer of a cash register, can no longer therefore lead to disputes between individual members of the till staff.

Although other modifications and changes may be suggested by those skilled in the art, it is the intention of the inventors to embody within the patent warranted hereon all changes and modifications as reasonably and properly come within the scope of their contribution to the art.

We claim:

1. A till drawer for a cash register having a drawer housing, comprising:
    a money drawer which is alternately displaceably guided along push-in and draw-out directions in the drawer housing of the cash register,
    a lid selectively closing said money drawer, said lid being displaceably guided on said money drawer; and
    a locking device mounted to detachably lock said lid to said money drawer in a closed position in which said lid closes said money drawer, said locking device connecting said lid to the drawer housing when said money drawer is slid in the drawer housing and detaching said lid from the drawer housing when said locking device is in a locking attachment to said money drawer, said locking device including a latch device which is actuated to latch-lock said lid to the drawer housing by sliding-in said money drawer into the drawer housing, said locking device includes a lock bolt provided with a lock, said lock bolt being movable between a locking position blocking any movement of the lid and an unlocking position freeing such a movement; and
    a stop on said lid which prevents said money drawer from being pulled fully out whenever said lid is connected to the drawer housing.

2. A till drawer as claimed in claim 1, wherein said latch device is a latch lever extending parallel to a direction of motion of said lid and pivotable in a plane of said lid about a swivel axle mounted on said lid, a spring mounted to bias said latch lever into a latch-locking position.

3. A till drawer as claimed in claim 2, further comprising:
    a latch boss at a front end of said latch lever in a slide-in direction of said lid,
    a pin secured on the drawer housing in a position so that said latch boss grips said pin when said drawer is at least partially in the drawer housing
    a rear end of said latch lever, in the slide-in direction, extending nearly up to a rear edge of said lid.

4. A till drawer as claimed in claim 3, wherein said locking device is disposed and configured so as to act upon the rear end of said latch lever.

5. A till drawer as claimed in claim 1, wherein said stop comprises a rear edge of said lid which is bent over in a direction of said money drawer, said stop being of a width greater than a distance between said lid and a top edge of said money drawer.

6. A till drawer as claimed in 1, wherein said locking device includes means to lock said money drawer with said lid, in a position slid into the drawer housing to the drawer housing, and means to release said money drawer from the drawer housing.

7. A till drawer as claimed in claim 1, further comprising:
    a receiving tray on said lid, close to a front end of said lid in a slide-in direction for at least one integrated circuit chip card, and
    contact elements disposed, on one hand, on said lid and, on another hand, on the drawer housing for cooperative contact with said contact elements on said lid when said lid is in the drawer housing.

8. A till drawer as claimed in claim 7, further comprising:
    a cover on said receiving tray which is pivotably mounted on top side of lid.

* * * * *